US005134013A

United States Patent [19]

Parker

[11] Patent Number: 5,134,013

[45] Date of Patent: Jul. 28, 1992

[54] FOLDING AND CRIMPING APPARATUS

[75] Inventor: Johnny M. Parker, Vashon, Wash.

[73] Assignee: Eco-Pack Industries, Inc., Kent, Wash.

[21] Appl. No.: 533,755

[22] Filed: Jun. 6, 1990

Related U.S. Application Data

[62] Division of Ser. No. 430,861, Nov. 2, 1989, Pat. No. 5,088,972.

[51] Int. Cl.[5] ........ B32B 3/28; D04H 1/04

[52] U.S. Cl. ........ 428/182; 428/174; 428/184; 428/211; 428/196; 428/222; 428/226; 428/227; 428/229; 428/292; 428/298; 428/299; 428/369; 428/370; 493/967; 493/968; 220/429

[58] Field of Search ........ 428/182, 184, 222, 174, 428/2, 196, 152, 153, 532, 535, 226, 227, 229, 230, 292, 369, 211, 298, 299, 370; 493/967, 968; 220/429; 267/141

[56] References Cited

U.S. PATENT DOCUMENTS

| | | | |
|---|---|---|---|
| 1,680,203 | 8/1928 | Cannard | 493/967 |
| 1,985,676 | 12/1934 | Hand | 270/73 |
| 2,045,498 | 6/1936 | Stevenson | 28/1 |
| 2,621,567 | 12/1952 | Lee | 93/1 |
| 2,668,573 | 2/1954 | Larsson | 154/30 |
| 2,679,887 | 6/1954 | Doyle et al. | 154/30.05 |
| 2,686,466 | 8/1954 | Lee | 100/97 |
| 2,770,302 | 11/1956 | Lee | 164/60 |
| 2,786,399 | 3/1957 | Mason et al. | 93/1 |
| 2,865,080 | 12/1958 | Hentschel | 28/1 |
| 2,924,154 | 2/1960 | Russell et al. | 93/1 |
| 2,968,857 | 1/1961 | Swerdloff et al. | 28/72 |
| 3,126,095 | 3/1964 | Caines et al. | 428/369 |
| 3,150,576 | 9/1964 | Gewiss | 93/84 |
| 3,217,988 | 11/1965 | Lightfoot et al. | 241/101 |
| 3,235,442 | 2/1966 | Stump | 428/369 |
| 3,398,223 | 8/1968 | Schatz et al. | 264/282 |
| 3,501,565 | 3/1970 | Kalwaites et al. | 264/287 |
| 3,509,797 | 5/1970 | Johnson | 493/407 |
| 3,613,522 | 10/1971 | Johnson | 156/183 |
| 3,650,877 | 3/1972 | Johnson | 493/407 |
| 3,754,498 | 8/1973 | Gil | 100/97 |
| 3,859,695 | 1/1975 | Erickson | 28/1.7 |
| 3,905,057 | 9/1975 | Willis et al. | 5/337 |
| 4,012,932 | 3/1977 | Gewiss | 72/187 |
| 4,075,746 | 2/1978 | Roberts | 28/264 |
| 4,085,662 | 4/1978 | Ottaviano | 493/354 |
| 4,132,155 | 1/1979 | Hicks et al. | 493/354 |
| 4,201,128 | 5/1980 | Whitehead et al. | 100/97 |
| 4,247,289 | 1/1981 | McCabe | 493/386 |
| 4,410,315 | 10/1983 | Frye | 493/342 |
| 4,597,748 | 7/1986 | Wolf | 493/29 |
| 4,622,028 | 11/1986 | Bunch | 493/413 |
| 4,650,456 | 3/1987 | Armington | 493/464 |
| 4,699,609 | 10/1987 | Komaransky et al. | 493/357 |
| 4,700,939 | 10/1987 | Hathaway | 270/39 |
| 4,717,135 | 1/1988 | Hathaway | 270/52.5 |
| 4,718,654 | 1/1988 | Ehlers | 220/52.5 |
| 4,868,037 | 9/1989 | McCullough | 428/222 |

FOREIGN PATENT DOCUMENTS 771877 4/1957 United Kingdom .

*Primary Examiner*—Ellis P. Robinson
*Assistant Examiner*—Donald J. Loney
*Attorney, Agent, or Firm*—James L. Sherman

[57] ABSTRACT

This invention comprises apparatus and methods for folding and crimping shredded strips of sheet material into preselected lengths of interlocking, decorative material and/or bulk packaging material. The apparatus generally includes an attachment for a commercial paper shredding device which shreds sheet material therein. The apparatus comprises a movable barrier against which the shredded strips of sheet material are impelled upon being expelled from cutting blades of the shredding device. The movable barrier causes the strips to become controllably jammed within a confined area between the barrier and the cutting blades. Further insertion of additional strips into the confined area causes the strips to become compacted, folded, and crimped against a remaining dam of jammed sheet material located within the confined area. This causes the strips to fold and press against themselves, and form lengths of thin sheet material having an accordion-shaped configuration. Cutting blade components may be provided to further cut the strips into preselected lengths.

22 Claims, 7 Drawing Sheets 30
32
34
36
38
40
42
43
44
45
46
47
48
50
60
60'
62
70
72
74
76
78
80
82
84
88
98
100
104
106
108
110
112
114
116
118
120
122
IV
1a
ABC

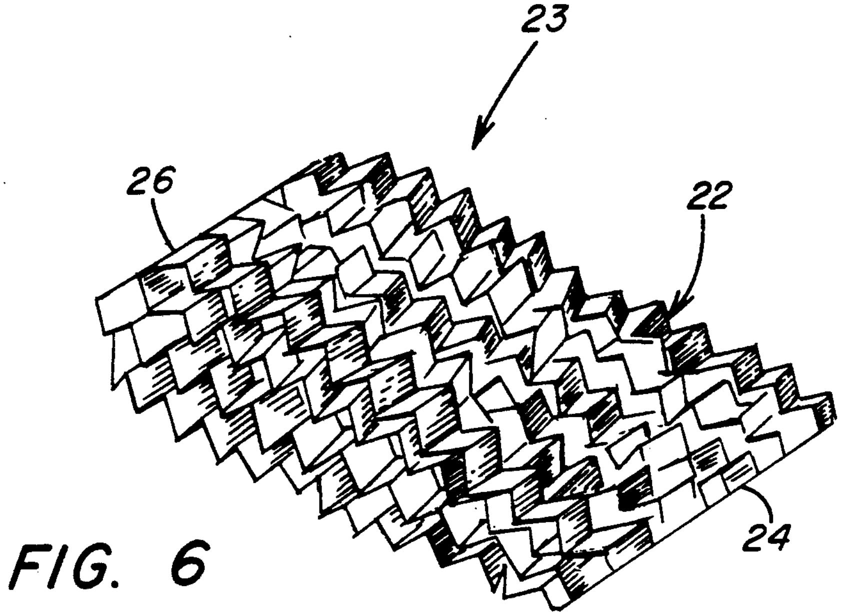
FIG. 6
FIG. 7
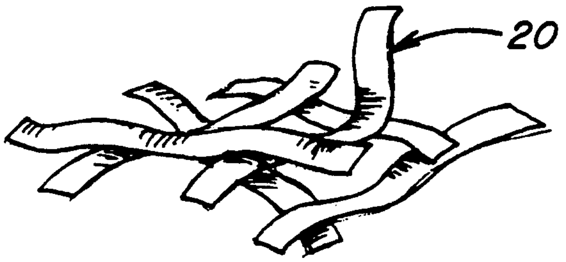
PRIOR ART
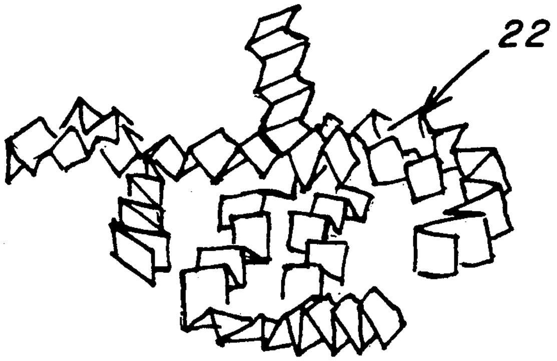
FIG. 8

FOLDING AND CRIMPING APPARATUS

This is a division of application Ser. No. 430,861 filed on Nov. 2, 1989, now U.S. Pat. No. 5,088,972.

TECHNICAL FIELD

The present invention relates to improvements in a paper shredding device. More particularly, this invention relates to apparatus and methods for folding and crimping shredded strips of sheet material into selected lengths of interlocking, bulk, packaging material.

BACKGROUND ART

Styrofoam pellets or peanuts are commonly used within the wholesale and retail industries as bulk packaging material. The peanuts are used to position a product away from the interior sides of a container and fill the empty space located therebetween. The peanuts are intended to protect the packaged product against the impact of a blow or other mistreatment.

Dispensing styrofoam peanuts does not require a great degree of sophistication. The peanuts are simply gravity fed from large retainer bins into the empty spaces within a packaging container.

Use of styrofoam peanuts, however, has many drawbacks. For example, if styrofoam peanuts are used to protect a heavy object placed within a container, and such package is jostled and shaken, the object usually gravitates toward the bottom of the container and the peanuts float upward. Eventually the object comes to rest against the base or side of the container and damage to the object may occur. The light weight of styrofoam peanuts also allows them to be easily blown by the wind and scattered.

Of particular concern, styrofoam peanuts are extremely difficult to dispose of and destroy after use. In fact, because of the extensive use of this nonbiodegradable product, which emits toxic gases if burned, styrofoam peanuts present a major threat to the environment and are being banned from an increasing number of communities.

Styrofoam peanuts are also dangerous to children and to wildlife who often mistake them as food and consequently ingest them. Styrofoam peanuts are not digestible and cause a major source of tracheal blockage in children.

Other packaging filler materials, such as shredded paper, have also been used. Shredded paper, however, usually lays flat within the container and a very large amount of paper is required to provide the bulk needed to fill the voids and to protect the contained object. To provide such a large amount of shredded paper is often cost prohibitive and, following its use, such voluminous amounts of paper must be disposed. In addition, the shock absorbency of flat shredded paper is minimal.

The following patents describe various paper shredding machines: Lee (U.S. Pat. No. 2,621,567; issued Dec. 16, 1952); Lee (U.S. Pat. No. 2,686,466; issued Aug. 17, 1954); Gil (U.S. Pat. No. 3,754,498; issued Aug. 28, 1973); and Whitehead et al. (U.S. Pat. No. 4,201,128; issued May 6, 1980). Lee ('567) teaches that during the passage of the paper through the shredding machine, the strips are kinked at spaced-apart points along their lengths.

The inventor believes the known prior art taken alone or in combination neither anticipate nor render obvious the present invention. These citations do not constitute an admission that such disclosures are relevant or material to the present claims. Rather, these citations relate only to the general field of the disclosure and are cited as constituting the closest art of which the inventor is aware.

DISCLOSURE OF INVENTION

It is the general object of the present invention to provide apparatus and methods for rapidly folding large quantities of shredded strips or strands of sheet material into continuous or segmented lengths of folded and crimped, interlocking, bulk packaging material, such apparatus being: sturdy and durable in design; compact; easily constructed; inexpensive to manufacture; and economical and simple to operate.

A further object is to provide apparatus and methods for producing large quantities of folded and crimped, shredded strips of sheet material which: avoid interference with the otherwise normal operation of a conventional shredding device; does not require permanent modification of the shredding device's structure, or defacement or mutilation thereof; and may be used on any commercial shredding device, irrespective of its design or general configuration.

A still further object is to provide apparatus and methods for a commercial shredding device which allows for quick and easy adjustment of the device to selectively extend or shorten the length of the shredded, folded, and crimped strips of sheet material into segment lengths which would otherwise be commercially impossible, and to do so without requiring modification of the device's structure, extensive knowledge of the device's mechanics, or any careful or critical attention by the operator.

Another object is to produce a series of folded, interlocking strips of bulk packaging material which are produced from colored sheet material and may be made from a large variety of different colors or controlled combinations of colors.

Another object is to produce the folded, interlocking strips from biodegradable pulp materials such as from paper, cardboard, and the like, the composition of which may be edible and is approved by the U.S. Federal Food and Drug Administration (FDA) for use in packaging edible products.

The present invention achieves these general and specific objects and presents new apparatus and methods for producing a bulk packaging material which incorporates therein the beneficial features of both styrofoam peanuts and shredded paper. The present invention also overcomes each of the previously mentioned disadvantages.

In short, this invention provides apparatus and methods for rapidly producing large quantities of bulk packaging material comprising folded and crimped, interlocking strips of sheet material which may:

(a) be used as a resilient padding to cushion and prevent heavier objects from gravitating toward the bottom and/or sides of a container, such padding requiring a lesser amount of raw material to form a greater amount of interlocking bulk packaging material than was previously available:

(b) be produced with selectable lengths, smaller lengths capable of being gravity fed into a container to fill the void left by the banning of styrofoam peanuts, larger lengths capable of being wrapped around a product to provide a secure protective cushion;

(c) be produced in selectable colors and/or controlled color combinations for decorative and aesthetic purposes;
(d) be manufactured from biodegradable material, such as pulp material (i.e., paper, cardboard, or the like); and
(e) be edible and/or approved by the U.S. Federal Food and Drug Administration (FDA) for use in packaging edible products.

The invention comprises an attachment for a commercial shredding machine or device. The attachment is a simple, compact, rugged, inexpensive, movable barrier which is easily attached and employed. The present invention does not necessarily require the defacement or alteration of the shredding device's structure. In essence, the attachment modifies the shredding device to cause a sheet material, such as mylar, paper, cardboard, or the like, which is fed therethrough, to be impacted or impelled against a barrier after having passed through a series of cutting blades in the shredding device.

The barrier causes the shredded sheet material to become controllably jammed between the barrier and the cutting blades. The continued rotation of the cutting blades forces additional amounts of sheet material into the shredding machine and cutting blades. As a result, each shredded strip of sheet material is folded against itself in a relatively controlled manner, thereby, repetitively folding and crimping or creasing each strip and compacting it within a confined space or area against a remaining dam of jammed shredded strips. The resulting effect is the folding or crimping of each cut strip into an accordion-shaped mass.

The confined area preferably is located near an exit opening of the shredding device through which the shredded strips pass.

As pressure builds up behind the confined mass of shredded strips, a pressure sensitive gate opens to allow the escape of a portion of the jammed strips. The gate controllably maintains the confinement of a remaining portion of jammed strips within the confined area. The gate thus allows the continuation of additional lengths of shredded sheet material to be folded and pressed against the remaining dam of jammed strips without the modified device actually becoming jammed to the point of requiring servicing.

The means for controllably jamming the paper within the confined area may comprise a simple, movable barrier which is placed near the exit opening of the shredding device. The barrier causes the shredded strips of sheet material to temporarily remain within a confined area located between the barrier and the cutting blades of the shredding device.

The confined area may be of a fairly small or large volume, the boundaries of which are initially defined by the barrier, the cutting blades, and possibly a lower, upper, and side support elements. After a partial dam of shredded strips has been achieved, the dam itself further limits the volume of space remaining within the confined area. As long as a partial dam of shredded strips remains within the confined area, such shredded strips serve the purpose of the moveable barrier, and may even eliminate the need for continued use of the gate barrier.

In its simplest form, the barrier comprises a movable gate which is urged toward a closed position. The gate serves to hinder the exit of the shredded strips and to confine the strips into a partially jammed state. As additional amounts of sheet material are fed or pulled into the shredding device, the expelling force of the shredding device forces the shredded strips into the confined area. Once the pressure forcing the jammed strips into the confined area overcomes the means for urging the gate into a closed position, the gate is urged open to allow a portion of the folded and crimped strips to escape.

Various methods and apparatus may be used to urge the gate toward its closed position and thereby retain the shredded strips within the confined area. For example, a weighted, hinged gate may be used. Other embodiments include the use of a pivotal gate which is urged toward its closed position by a spring or by a hydraulic or pneumatic piston.

Once the folded and crimped strips of sheet material are formed, the strips may be deposited within a receiving bin.

Alternatively, upon leaving a confined are, located immediately adjacent to the cutting blades, the compressed state of the folded and crimped strips may be maintained by forcing the strips to travel through a confined conduit. A second cutting device or shearing device may be located at some point along the length of the confined conduit or at the end thereof. The shearing device may be engaged to cut or shear the compacted, folded, and crimped strips into segments.

Continued insertion of additional lengths of sheet material into the shredding device at a regulated rate naturally causes the folded strips to exit the shredding device at a similar regulated rate. If the strips are passed through the confined conduit and a shearing device is used, the shearing device may be activated at preselectable time intervals to shear, cut, or dissect the compressed, crimped strips traveling within the confined conduit into various segment lengths. This process enables the formation of crimped strips of material having any desired length from 100 foot lengths or greater to segments of one or two inches or smaller.

If a plurality of layers of sheet material are passed through the shredding device at one time, the shearing device forces each layer against an adjacent layer with a tremendous force. This force is necessary to cause the multiple layers of sheet material to sheer. Such compression, however, has an added benefit of sealing together or partially bonding the sheared ends of the juxtaposed and sheared strips. The bonding of each overlapping layer of sheet material to the proximately juxtaposed sheet material assists in maintaining the structural integrity the interlocking folded and crimped strips. Thus, a plurality of layered, shredded, folded and crimped strips of sheet material may be cut into short segments that are bonded at each terminal end thereof. These shorter segments serve very well to replace the use of styrofoam peanuts. Such shorter segments may also be used in existing gravity feed systems.

Longer lengths of the shredded folded and crimped strips may be used for decorative effects at parties and/or window or room displays.

The longer lengths of the folded strips may also be used as bulk padding and packing material. When so used, the object to be protected may be liberally and literally wrapped within multiple lengths of interconnecting and interlocking folded and crimped, shredded strips.

Because the ridges of the paper strips interlock with one another, the strips hold their form and greatly increase the volume of space they occupy. Thus, the use of a smaller amount of paper is required to protect a particularly packaged object. The shock absorbency of the packing material is also substantially increased, since the impact of a blow is disbursed throughout each interacting ridge or web of the interconnecting folded strips. The folded and crimped status of the strips of the present invention allows for a substantially greater degree of interlocking effect and shock absorbency than do the kinked strips described in Lee ('567).

If paper sheet material is used, the longer lengths of crimped, shredded strips may be placed within a retainer bin or hopper and a selected amount of bulk packaging material may be torn therefrom. This enables an operator to use an exact amount of desired packaging material, and thereby reduce waste.

Another important, added benefit of the present invention is the ability to use a variety of colors in the production of the shredded, folded and crimped strips. This enables the inventor to produce bulk packaging material of the present invention having the chosen colors of a particular store, company, or corporation. This is accomplished by simply using a sheet material having the desired color.

A combination of colors may also be used. Two or more differently colored sheets of material may be passed into the shredding machine to produce a variety of color combinations. The only limiting factor is the capacity of the shredding machine. For example, a first percentage of one color (such as 23% of dark blue) and a second percentage of another color (such as 77% of light blue) may be used. Thus, folded and crimped strips of packaging material may be produced with any number of colored sheet material combinations.

Printed, embossed, or any other means of identification may also be affixed to the sheet material which is shredded. Preferably, such printing locates the printed matter longitudinally along each length of shredded strip. Thus, a store, company or corporation may have its name, logo, trademark, or other subject matter, listed along each individually crimped strip.

Another important benefit is that recyclable, biodegradable sheet material may be used. By using pulp materials, such as paper and/or cardboard which breakdown and decompose quickly, the detriment to the environment by disposal of such material is minimized.

Depending upon the composition of the sheet material, the environment may even be enhanced by the discarding of such packaging material. For example, fertilizers or other beneficial additives may be incorporated into the sheet material. These benefits are in stark contrast to the damage caused by the disposal of styrofoam peanuts.

Existing apparatus and methods for packaging food products often cause substantial damage to the very products they are intended to protect. For example, existing apparatus and method for packaging flash frozen fish often cause scaring to appear on the fish. This difficulty is greatly overcome by the present invention because when the folded an crimped strips of the present invention are made from paper and are exposed to moisture, the folded strips conform to the contour of the object being packaged. This provides a more uniform and larger support framework for the object and scaring is eliminated, or at least substantially reduced.

Edible sheet material and sheet material which has been approved by the U.S. Food and Drug Administration (FDA) for use in packaging edible, or at least consumable, products may also be used. Thus, the wholesale and retail food industries are now provided with apparatus and methods for packaging food products which have been hence unavailable.

Additional uses for the crimped sheet material include using it as bulk material for starting worm composts and/or animal bedding.

The apparatus which produces such a universal bulk packaging material is inexpensive, and is easily manufactured. Operation of the apparatus is also extremely simplistic and may be accomplished by an unskilled worker.

These and other objects and advantages of the present invention will become more readily apparent upon reading the following disclosure and referring to the attached drawings.

BRIEF DESCRIPTION OF DRAWINGS

FIG. 6 is an isometric view of a plurality of bonded segments of folded, crimped, interlocking strips of shredded sheet material which is a product of the present invention.

FIG. 7 is an isometric view of strips of shredded paper as found in the prior art.

FIG. 8 is an isometric view of a plurality of folded, crimped, interlocking strips of shredded sheet material as produced by the present invention.

Figures 1, 1A:
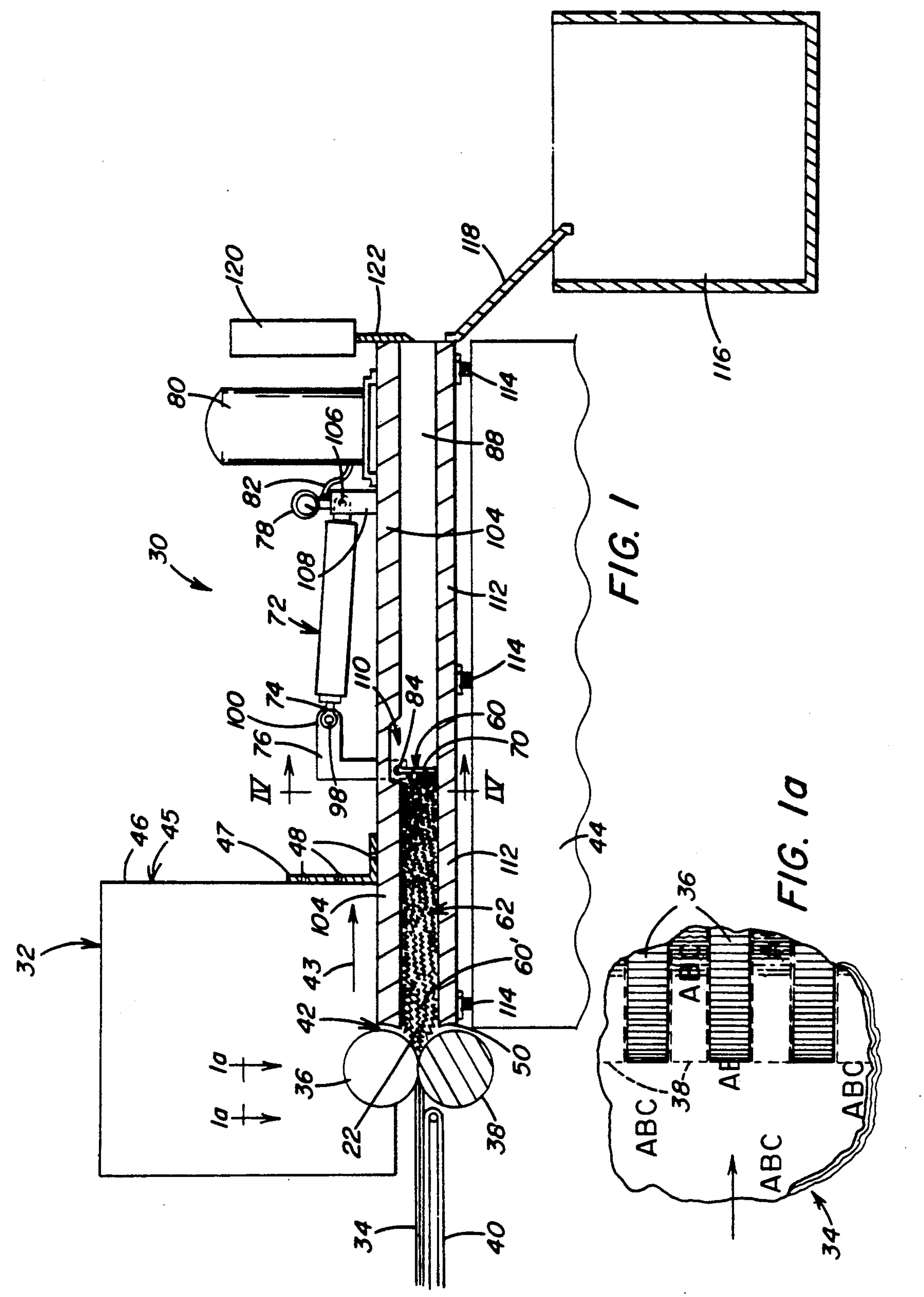
FIG. 1 is a partial, cross-sectional, side elevational view of the preferred embodiment of the present invention wherein a hinged gate is shown located in a closed position to serve as a barrier.
FIG. 1*a* is a fragmentary top view of the preferred embodiment as seen along line 1*a*—1*a* of FIG. 1.

One should understand the drawings are not necessarily to scale, and the elements are sometimes illustrated by graphic symbols, phantom lines, diagrammatic representations, and fragmentary views. In certain instances, the inventor may have omitted details which are not necessary for an understanding of the present invention or which render other details difficult to perceive.

BEST MODE FOR CARRYING OUT THE INVENTION

Referring to the drawings and particularly to FIG. 7, wherein like numerals indicate like parts, the prior art generally teaches that sheets of paper may be cut into elongate strips 20. Strips 20, however, do not provide very much resiliency or forgiveness when subjected to a blow or other mistreatment. A large number of strips 20 are required to fill a given empty space.

FIG. 8 illustrates a plurality of shredded, elongate, interconnecting strips 22 which have been folded and crimped using the apparatus and methods as taught herein. The folds within crimped strips 22 interlock with one another to form a resilient mass of intertwined and interconnected strips of decorative or bulk packaging material. The folds also form a variety of differently angled flanges and/or webbing which distribute any blow or impact received in a disbursed manner throughout each interconnecting fold of the interlocked crimped strips 22. Such folds also cause crimped strips 22 to occupy a greater volume of space, using a smaller amount of sheet material, than would otherwise be required.

FIG. 6 illustrates a plurality of shredded, elongate, interconnecting strips 22 which have been folded, crimped, and sheared into strip segments 23. Strips 22 have also been bonded together at a forward terminal end 24 and a rearward terminal end 26 thereof to form strip segment 23.

FIG. 1 illustrates the preferred embodiment of a crimping apparatus 30 which may be attached to a readily available commercial shredding device 32 Any appropriate shredding device 32 may be used.

Various shredding devices 32 are well known in the prior art and need not be further described herein except to mention that sheet material 34 is fed into a plurality of parallel cutting blades 36 and 38 which rotate therein, cutting sheet material 34 into a plurality of strips 20.

A conveyor belt 40 may be used to support and urge sheet material 34 into cutting blades 36 and 38. Conveyor belt 40 may be free rolling or be powered by a motor (not shown).

Preferably, as seen in FIG. 1*a* cutting blades 36 and 38 are serrated cutting blades which facilitate easy shredding of sheet material 34 and which assist in pulling sheet material 34 into shredding device 32 once sheet material 34 engages cutting blades 36 and 38.

When passed between cutting blades 36 and 38, sheet material 34 is cut into elongate strips 20 which are then directed toward, and expelled outwardly from, an exit opening 42 of shredding device 32. Strips 20 are generally expelled through exit opening 42 at a very rapid rate. In the preferred embodiment strips 20 are expelled from exit opening 42 along a path generally indicated by arrow 43 at a rate of 125 feet per minute (120 ft./min.).

Crimping apparatus 30 is primarily a simple, durable, easily constructed, and inexpensive attachment for shredding device 32 which may be easily attached and employed.

Attachment of crimping apparatus 30 to or near shredding device 32 may be accomplished by any appropriate means, and does not necessarily require permanent modification or defacement of shredding device 32. For example, crimping apparatus 30 may be attached or secured to an elevated stand or support member 44, which is attached to an underlying structure (not shown) and/or has sufficient weight to resist movement. The bulk of the weight of crimping apparatus 3 may rest upon support member 44. Thus attached, crimping apparatus 30 may be properly positioned near exit opening 42 without even being attached to shredding device 32.

Figure 2:
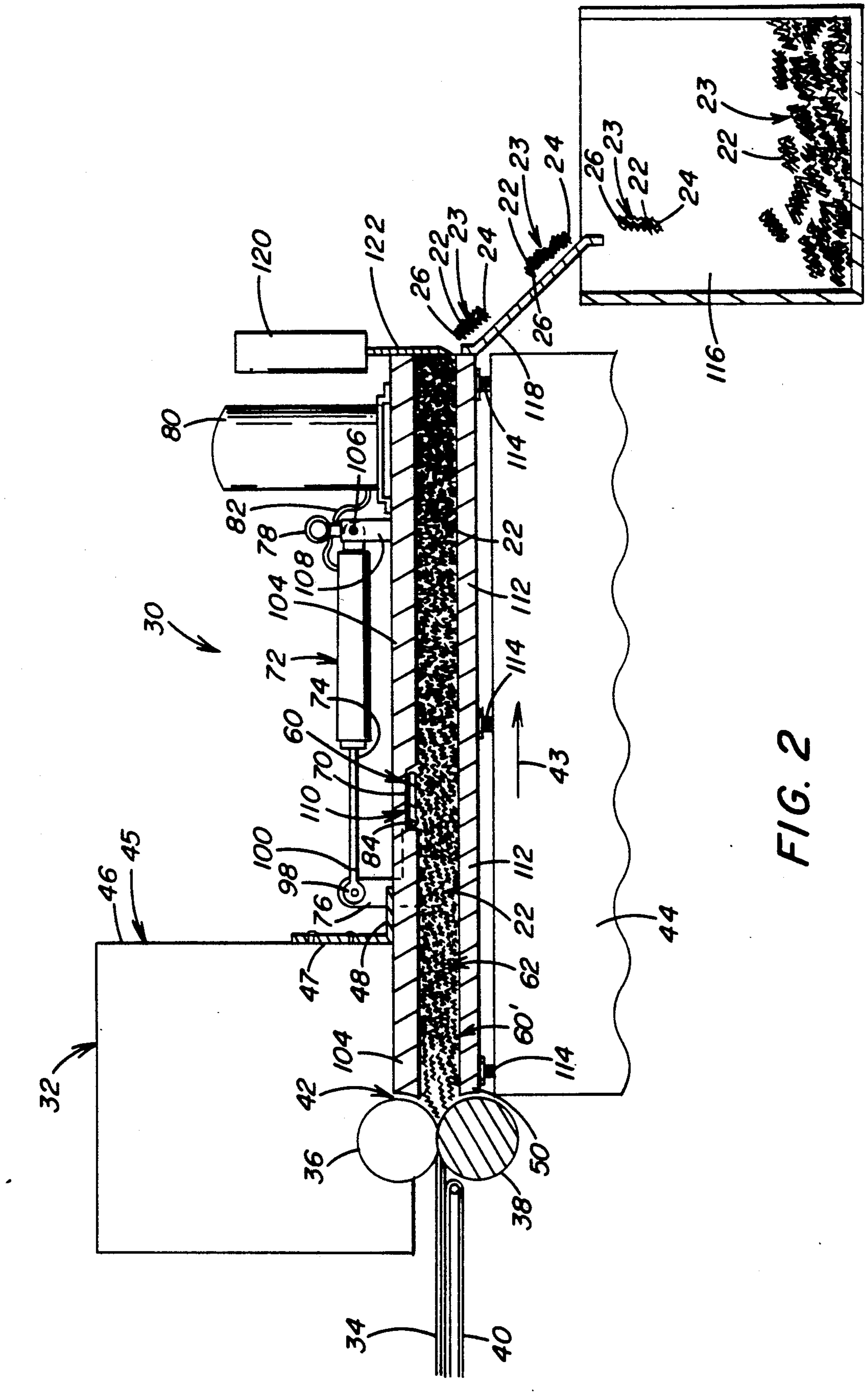
FIG. 2 is a partial, cross-sectional, side elevational view of the apparatus shown in FIG. 1, wherein the gate is urged away from its closed position.

Alternatively crimping apparatus 30 may be physically secured to shredding device 32. For example, crimping apparatus 30 may be removably attached to a structural framework 45 of shredding device 32 by any appropriate support means. As shown in FIGS. 1 and 2, crimping apparatus 30 is removably attached to the enclosure of shredding device 32, such as to a rear wall 46, by means of a supporting bracket 47, such as a section of angle iron. Means for removably attaching supporting bracket 47 to crimping apparatus 30 and to structural framework 45 of crimping apparatus 32 may comprise a plurality of removable screws 48, bolts, or the like. If used as an optional or retrofit attachment, crimping apparatus 30 is positioned adjacent to exit opening 42. If space within shredding device 32 allows, a forward end 50 of crimping apparatus 30 is positioned immediately adjacent to a expulsion side of cutting blades 36 and 38.

Shredding device 32 may also be specifically designed to incorporate therein the subject matter of this invention, alleviating the need for an attachment.

Crimping apparatus 30 modifies shredding device 32 to cause sheet material 34, which may be made of mylar, paper, cardboard, or the like, and is fed therethrough, to be initially impacted or impelled against a barrier 60 after passing between cutting blades 36 and 38. Barrier 60 causes the shredded strips 20 to assume a partially jammed state within a compression chamber or confined area 62 located between barrier 60 and cutting blades 36 and 38.

Continued shredding of additional sheet material 34 by shredding device 32 forces additional elongate strips 20 into confined area 62 forming a dam of temporarily jammed strips 20. Once a dam of shredded strips 20 is formed, the front of the dam, which is located most closely to cutting blades 36 and 38, serves itself as a barrier 60'. As additional amounts of sheet material 34 are fed or pulled into shredding device 32, the expelling force exerted by cutting blades 36 and 38 forces strips 20 into confined area 62. As strips 20 are forced against barriers 60 or 60', strips 20 are confined within confined area 62 and are forced to folded against themselves in a relatively controlled manner. Such folding and further insertion of strips 20 into confined area 62, causes the folded strips to become compacted against themselves and each other, thereby creating crimped strips 22. The compaction of strips 20 within confined area 62 causes strips 20 be crimped at each fold. Continued insertion of strips 20 into confined area 62 against barrier 60 or 60' repetitively, and relatively uniformally folds and crimps each strip 20 into an accordion-shaped mass of crimped strips 22.

The function of crimping apparatus 30 is to serve as a pressure sensitive barrier 60 which is capable of temporarily damming the passage of strips 20 which are expelled from shredding device 32. Toward this end, crimping apparatus 24 is provided with a means for urging barrier 60 toward a closed position.

Figure 3:
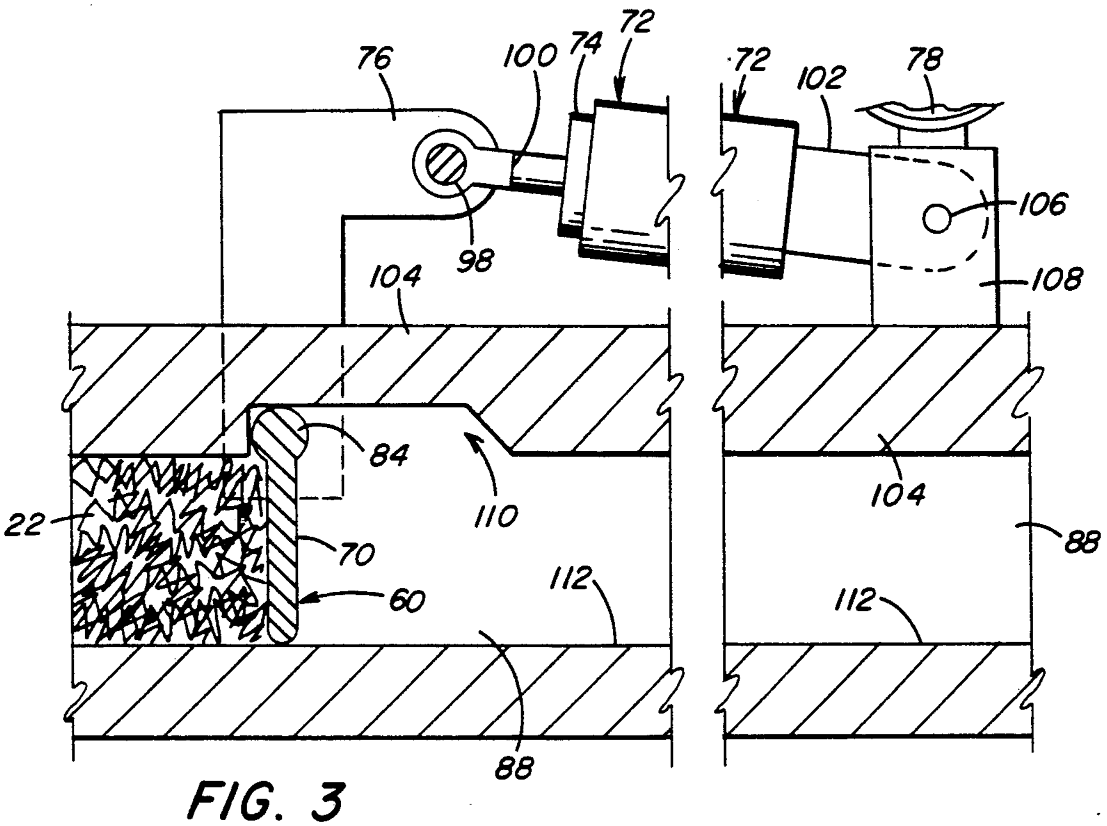
FIG. 3 is an enlarged, partial, cross-sectional, side elevational view of the gate in its closed position.

In its preferred embodiment, barrier 60 comprises a compression door or gate 70 having a closed position, located within a generally vertical plane, and an open position, located within a generally horizontal plane. FIGS. 1 and 3 illustrate gate 70 in a closed position. FIG. 2 shows gate 70 in an open position.

Initially gate 70 is urged towards its closed position by an urging means 72. Urging means 72 may comprise a spring, a weight, or a pneumatically or hydraulically controlled piston 74 which is connected to gate 70 by a linkage means 76. The force exerted by urging means 72 upon gate 70 may be controlled by either the type of characteristics of the spring that is used, or by a valve means 78 that is attached to piston 74. If piston 74 is used, a fluid or air pressure reservoir 80 may also be provided and appropriately connected to the piston by means of a hose 82. Electronic pressure sensors may also be used to determine the amount of pressure which is being exerted upon gate 70 and to activate and/or release urging means 72 when needed.

Figure 4:
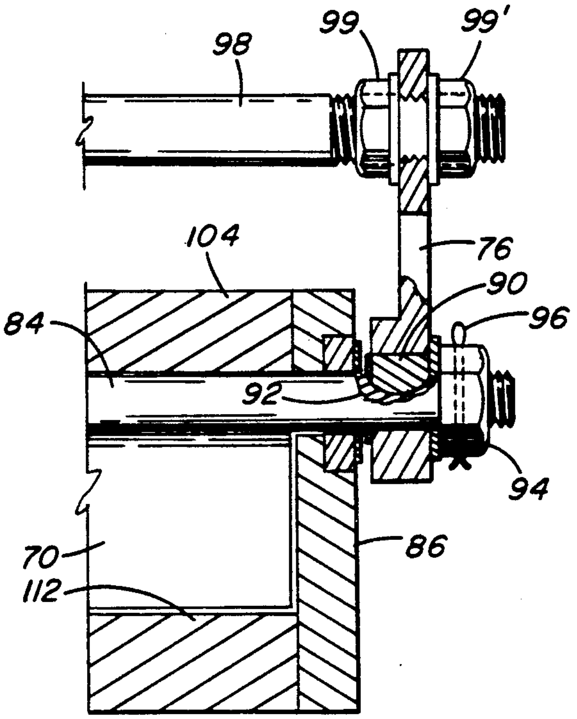
FIG. 4 is an enlarged, fragmentary, cross-sectional, front elevational view taken along line IV—IV in FIG. 1.
Figure 5:
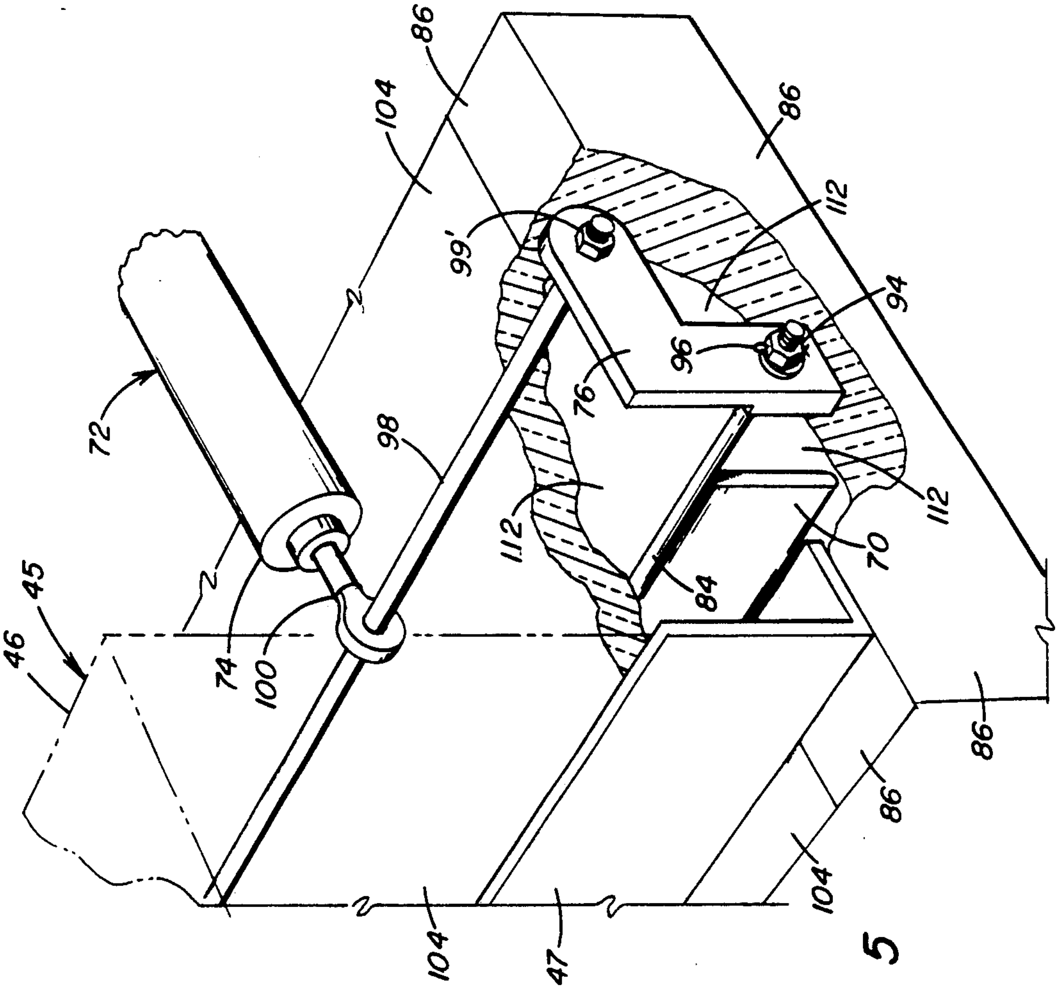
FIG. 5 is an enlarged, fragmentary, isometric view of the preferred embodiment shown in FIG. 1.
Figure 9:
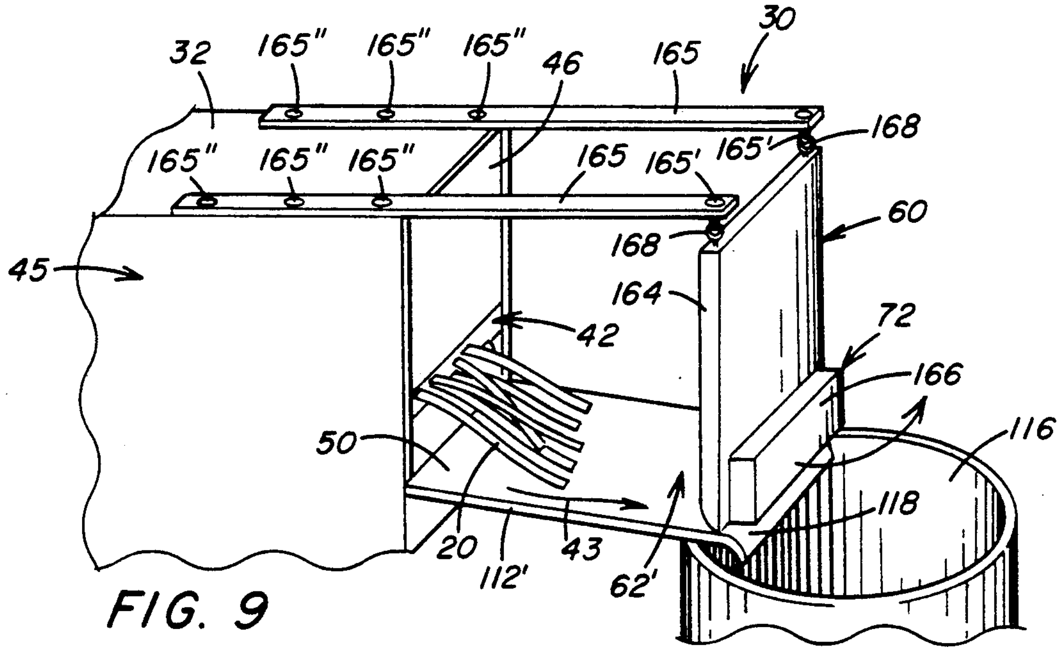
FIG. 9 is an isometric view of shredded strips of sheet material passing through an exit opening of a shredding device and entering a confined area located between the shredding device and a barrier, such as a gate having pivotal ability.

FIGS. 3 and 4 illustrate the attachment and function of gate 70, linkage means 76, and piston 74. Gate 70 spans the width of confined area 62 and is attached to a compression door shaft or pivotal rod 84. Pivotal rod 84 allows gate 70 to rotation between its open and closed position. Pivotal rod 84 may pass through side walls 86 and 88 which help define confined area 62. Pivotal rod 84 may be operationally secured to linkage means 76 by a key element 90 which is placed within a keyway 92 provided within pivotal rod 84 and linkage means 76. Linkage means 76 may comprise an angle arm as illustrated in FIGS. 1 through 5. Linkage means 76 is secured to pivotal rod 84 by means of a locking nut 94 having a cotter pin 96 located therein to prevent loosening of locking nut 94. Linkage means 76 is then connected to a second rod 98 or connector rod by means of a pair of nuts 99 and 99'. Second rod 98 is attached to a first end 100 of piston 74. A second end 102 of piston 74 is connected to either the structure of crimping apparatus 30 itself, or to any other element which will facilitate the operation of piston 74. FIG. 3 illustrates second end 102 of piston 74 being attached to an upper wall 104, which further defines confined area 62, by means of a pin 106 and support brace 108.

A recess 110 may be provided within upper wall 104 adjacent to pivotal rod 84 so that gate 70 may be retained therein when located in its open position. Thus, pivotal rod 84 and gate 70 do not obstruct the flow of crimped strips 22 when gate 70 is located in its open position.

In the preferred embodiment, confined area 62 is defined by gate 70, side walls 86 and 88, upper wall 104, and lower wall 112, and by cutting blades 36 and 38. However, once a dam of partially jammed crimped strips 22 are located within confined area 62, the frictional resistance between crimped strips 22 and the interior surfaces of upper wall 104, lower wall 112, and side walls 86 and 88, provides sufficient retaining force to eliminate the need for gate 70. At this point, gate 70 may be automatically or manually raised to its open position as shown in FIG. 2. The remaining dam of crimped strips 22 serves the function of gate 70. Therefore, the use of gate 70 is required only temporarily, until a sufficiently large dam of partially jammed crimped strips 22 are contained with confined area 62.

Given the above statements, barrier 60 may comprise any obstacle which will cause a sufficiently large amount of crimped strips 22 to become partially jammed with confined area 62 to the point that the frictional resistance along the interior sides of confined area no longer require the use of barrier 60. Therefore, an alternative embodiment of barrier 60 may be a simple board or other object with temporarily simulates the occurrence of jammed state. For example, a segment of wood, cardboard, or anything else that temporarily fills the void within confined area 62 will serve this function. A board may be used for this purpose. Or, alternatively, a given amount of previously produced strips 20 or 22 may be forced into confined area 62 to begin the above described process.

In addition, if it is desirable to increase the amount of frictional resistance between the crimped strips 22 and the interior side, upper, and lower walls of confined area 62, the volume of confined area 62 may be reduced. Thus the same amount of sheet material 34 would be forced through a smaller area of confined area 62. This may be accomplished by providing lower wall 112 with a means 114 for raising lower wall 112 with respect to upper wall 104 and to side walls 86 and 88. For example, as shown in FIGS. 1 and 2, support member 44 may be provided with a vertically oriented bolt extending therefrom which may be rotated to force lower wall 112 upward with respect to the remaining elements of crimping apparatus 30.

In the preferred embodiment, upper, lower and side walls 104, 112, 86, and 88 are made from aircraft LEXAN, which is a very workable transparent material that enables an operator to view the status crimping apparatus 30 as a glass. Other materials such as steel, aluminum, wood, plastic, or the like may also be used.

Once crimped strips 22 have been formed they may pass through confined area 62 and be deposited with a receiving bin 116. If needed, a chute or ramp 118 may be used to facilitate the movement of crimped strips 22 toward and into receiving bin 116.

The length of crimped strips 22 may also be limited. For example, if sheet material 34 has a limited length, then once such sheet material 34 passes through shredding device 32 and crimping apparatus 30, the crimped strips 22 that are formed will necessarily have a limited length.

Figure 13:
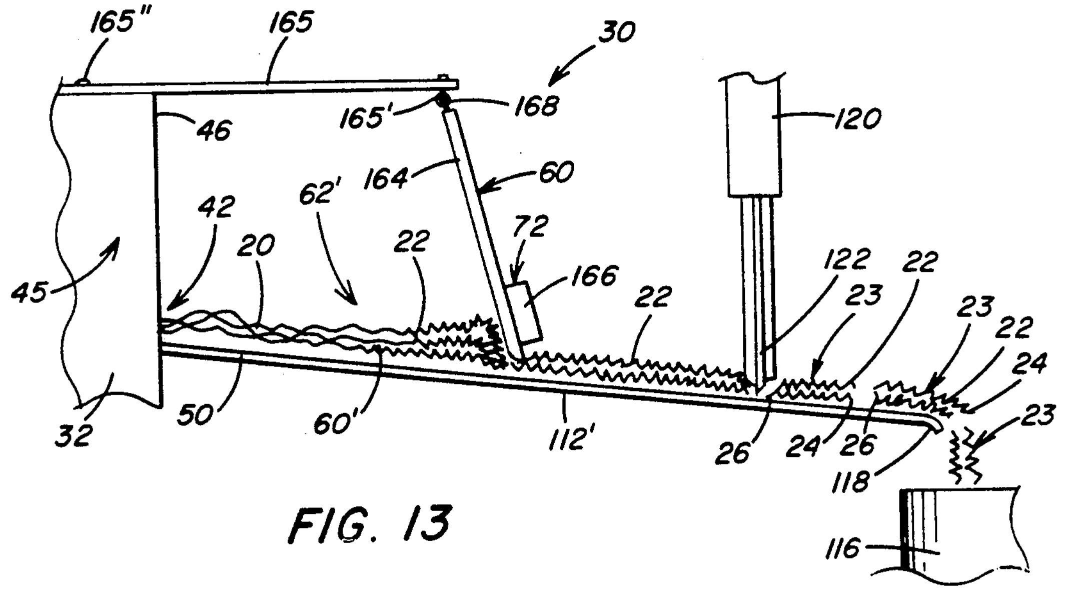
FIG. 13 is a schematic, fragmentary, elevational view of the present invention, wherein a cutting or shearing device is illustrated as cutting the folded and crimped strips into segments of a desired length.

Alternatively, continuous lengths of sheet material 34 may be passed through shredding device 32 and crimping apparatus 30. The compacted state of the folded, crimped, and compressed strips 22 may be maintained through crimping apparatus 30 by means of requiring crimped strips 22 to travel along a path having a generally confined area. A cutting, chopping, or shearing device 120 may then be engaged at preselected intervals to cut the compressed strips 22 into strip segments 23. As shown in FIGS. 1, 2, and 13, shearing device 120 may utilize a blade 122 to cut compressed crimped strips 22.

The length of crimped strips 22 may be controlled by: regulating the rate of passage of strips 22 through crimping apparatus 30; and/or regulating the rate or time interval between which blade 122 cuts strips 22. Thus, crimped strips 22 may be produced with lengths exceeding 100 feet or more or with lengths of less than one inch (1").

As has been explained above, the chopping or shearing of multiple layers of crimped strips 22 may compress such layer so strips 22 against one another to an extent that bonding between the strips 22 occurs. Thus strip segments 23 may be produced.

Now referring to FIGS. 9 through 13, in its simplest and original form, barrier 60 comprises a weighted, movable gate 164 which is positioned near exit opening 42 of shredding device 32. Gate 164 may be so positioned by securing an upper screws 165'. Brace members 165 are secured to structural framework 45 of shredding device 32 by any appropriate means, such as with screws 165", bolts, or the like.

Gate 164 is urged toward a closed, generally vertical position by a weight 166. The mass and location of weight 166 may be adjusted to control the force exerted by urging means 72. Weight 166 is secured to gate 164 in an unobtrusive location so as to not hinder the jamming, folding, and crimping effect of crimping apparatus 30. Gate 164, however, does hinder the exit of crimped strips 22 from confined area 62' until such exit is desired and/or necessary.

When gate 164 is located in its closed position, gate 164, lower wall 112', and rear wall 46 and/or cutting blades 36 and 38 define the boundaries of confined area 62'.

Figure 10:
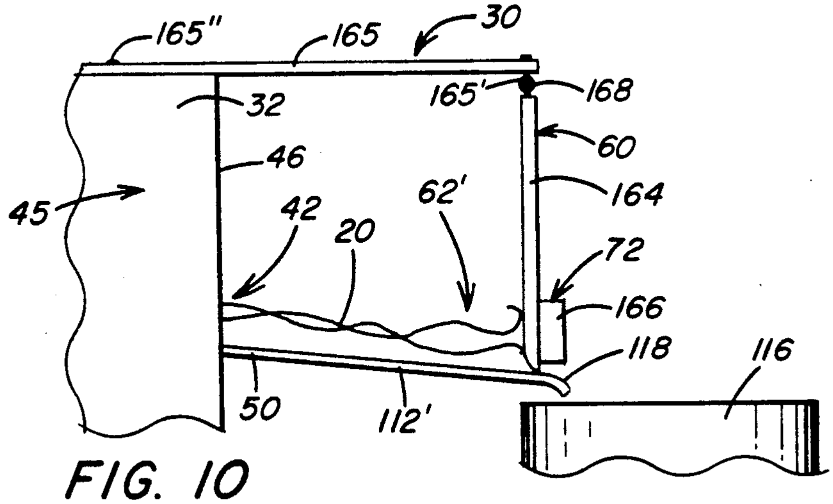
FIG. 10 is a schematic, fragmentary, elevational view of the shredding device and barrier shown in FIG. 9, wherein the shredded strips are illustrated as initially entering the confined area.

As seen schematically in FIG. 10, strips 20 are urged outwardly from exit opening 42 and are impelled against barrier 60. Barrier 60 causes strips 20 to be retained within confined area 62' adjacent to barrier 60. Strips 20 may temporarily rest upon lower wall 112'.

Figure 11:
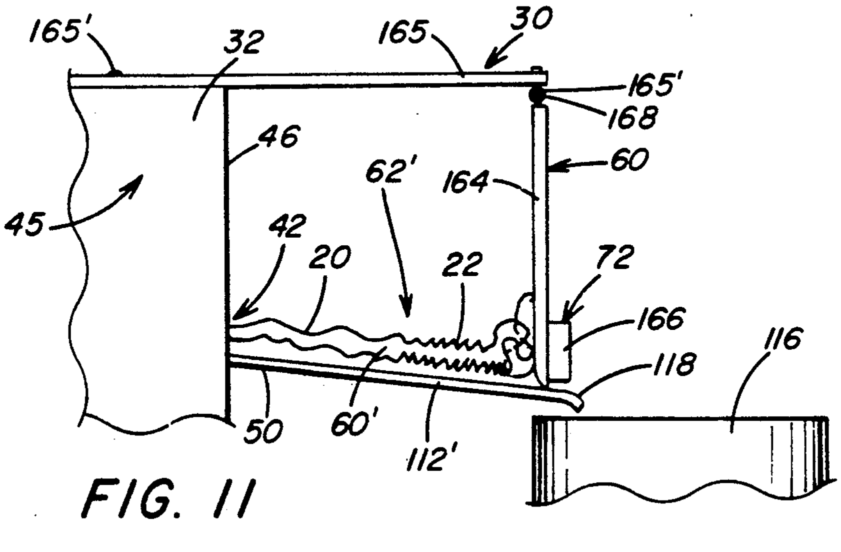
FIG. 11 is a schematic, fragmentary, elevational view of the shredding device and barrier shown in FIGS. 9 and 10, wherein the shredded strips are becoming dammed between the pivotal gate and the exit opening of the shredding device.

As seen in FIG. 11, shredding device 32 continues to feed additional shredded sheet material 34 (FIG. 1) outwardly from exit opening 42 into confined area 62', forcing sheet material 34 to fold against itself in a controlled manner, thereby, repetitively crimping and folding sheet material 34 into crimped strips 22.

Figure 12:
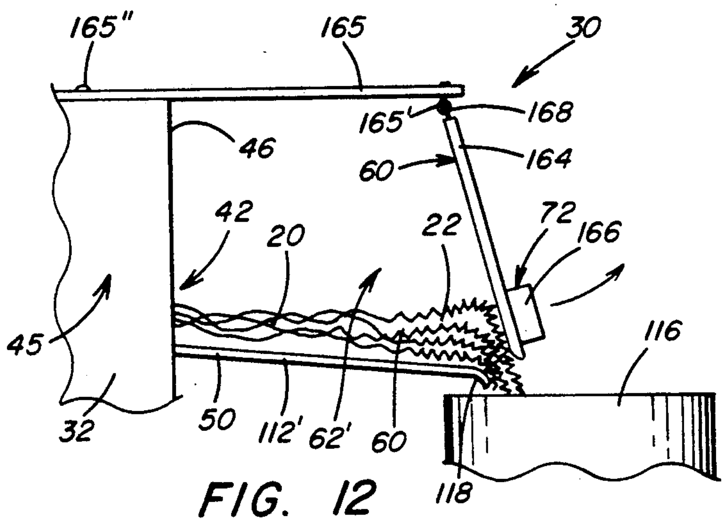
FIG. 12 is a schematic, fragmentary, elevational view of the shredding device, wherein the pivotal gate is partially deflected to allow a controlled portion of the folded and crimped strips of sheet material to pass thereby and be deposited within a receiving bin.

Shredding device 3 continues to feed additional shredded sheet material 34 outwardly from exit opening 42 into confined area 62'. Shredded sheet material 34 is again forced to fold against itself and continues to do so. Eventually a sufficiently large amount of sheet material 34 become temporarily dammed within confined area 62' that the pressure of additional sheet material 34 entering confined area 62' automatically urges gate 164 to pivot about a pivot point 168 to move outwardly and upwardly along a path generally designated by arrow 170 and open to allow the escape of a portion of crimped strips 22 from within confined area 62'. This event is shown in FIG. 12.

Once the outward pressure of the dammed strips 22 located within confined area 62' meets and exceeds the force of weight 166, such pressure urges gate 164 outward and upward toward a partially open position.

After passing under gate 164, and thereby escaping confined area 62', crimped strips 22 may be deposited by gravity into retaining bin 116.

Alternatively, upon escaping below gate 164, crimped strips 22 may be directed toward a cutting shearing device 120. Shearing device 120 cuts crimped strips 22 into strip segments 23 having a preselected length.

If sheet material 34 is fed into confined area 62' at a regulated rate, then crimped strips 22 will escape confined area 62' at a corresponding, second regulated rate. Crimped strips 22 may then be passed toward shearing device 120 to be dissected or cut at preselected, spaced time intervals. This systematically cuts crimped strips 22 to lengths directly related to such spaced time interval. An increase or decrease of such time interval, or an increase or decrease in the rate that sheet material 34 enters or exits shredding device 32 and/or confined area 62', will similarly alter the length of strip segmented 23.

The preferred method of producing crimped strips 22 comprises the following steps: (a) passing shredded sheet material 34 into confined area 62; (b) controllably preventing the exit of sheet material 34 from confined area 62; and (c) passing additional sheet material 34 against a portion of the previously confined sheet material 34 to cause such sheet material 34 to fold against itself and thereby become folded and crimped into a generally accordion-shaped strip.

An additional step may comprise the step of cutting crimped strips 22 into various segments.

The means and construction disclosed herein are by way of example and comprise primarily the preferred form of putting the invention into effect. Although the drawings depict a preferred and alternative embodiment of the invention, other embodiments have been described within the preceding text. One skilled in the art will appreciate that the disclosed device may have a wide variety of shapes and configurations. Additionally, persons skilled in the art to which the invention pertains might consider the foregoing teachings in making various modifications, other embodiments, and alternative forms of the invention.

It is, therefore, to be understood that the invention is not limited to the particular embodiments or specific features shown herein. To the contrary, the inventor claims the invention in all of its forms, including all alternatives, modifications, equivalents, and alternative embodiments which fall within the legitimate and valid scope of the appended claims, appropriately interpreted under the Doctrine of Equivalents.

INDUSTRIAL APPLICABILITY

The folding and crimping apparatus, and methods for use thereof, as described herein may be used to fold and crimp shredded strips of sheet material into selected lengths of interlocking, bulk packaging and/or decorative material. The shredded, folded, crimped, interlocking strips may serve as a resilient padding and/or wrapping material having various desired lengths. The crimped strips may be produced in a variety of colors or combination of colors and may have printing appearing thereon, as generally shown on sheet material 34 in FIG. 1*a*. The crimped strips are preferably made of recyclable, biodegradable material, and may also be made of an edible material or of a material which is approved by the U.S. Federal Food and Drug Administration for use with edible products. The apparatus is very durable in design, is easily constructed, is inexpensive and economical to manufacture, and is extremely simple to use.

I claim:

1. A packing product comprising:
   - a plurality of narrow, elongated strip means of flat, substantially planar material;
   - each of said strip means including a plurality of folds along a length thereof; and
   - said plurality of said strip means being intertwined and interconnected to form a resilient mass of said packing product.

2. The packing product according to claim 1, wherein adjacent said folds of said each strip means are disposed in generally opposite directions.

3. The packing product according to claim 2, wherein said each strip means includes portions between said adjacent folds which are substantially planar.

4. The packing product according to claim 1, wherein said material is selected from the group consisting of biodegradable material, pulp material, paper, cardboard, and mylar.

5. The packing product according to claim 1, wherein said each strip means includes at least two layers of said material.

6. The packing product according to claim 5, wherein said at least two layers of said material respectively include at least two colors to provide said two colors to said packing product.

7. The packing product according to claim 1, wherein said each strip means includes printing on at least one surface thereof.

8. A packing product comprising:

a plurality of intertwined and interlocking strip means of flat, substantially planar material;

each of said strip means including a plurality of folds with said material having been compressed at each of said folds; and said plurality of said intertwined and interlocking strip means with said folds having been compressed therein combining to provide a resilient mass of said packing product.

9. The packing product according to claim 8, wherein said folds have been compressed by compacting of said each strip means at least against itself.

10. The packing product according to claim 8, wherein said folds are relatively uniform to provide said each strip means with a general accordion shape.

11. The packing product according to claim 8, wherein adjacent said folds of said each strip means are directed to generally opposite directions.

12. The packing product according to claim 11, wherein said each strip means includes portions between said adjacent folds which are substantially planar.

13. The packing product according to claim 8, wherein said material is selected from the group consisting of biodegradable material, pulp material, paper, cardboard, and mylar.

14. The packing product according to claim 8, wherein said each strip means includes at least two layers of said material.

15. The packing product according to claim 14, wherein said at least two layers of said material respectively include at least two colors to provide said two colors to said packing product.

16. The packing product according to claim 8, wherein each said strip means includes printing on at least one surface thereof.

17. A packing product comprising:

a plurality of narrow, elongated strip means of flat, substantially planar material;

each of said strip means having a small width dimension and a substantially longer length dimension;

said each strip means having a plurality of substantially transverse folds;

said each strip means including adjacent longitudinal portions at respective opposite sides of each of adjoining said folds; and a majority of said adjacent longitudinal portions extending from said adjoining fold generally with an angle therebetween to cause said strip means to be generally accordion-shaped.

18. The packing product according to claim 13, wherein each of said adjacent longitudinal portions is substantially planar.

19. The packing product according to claim 17, wherein said material is selected from the group consisting of biodegradable material, pulp material, paper, cardboard, and mylar.

20. The packing product according to claim 17, wherein said each strip means includes at least two layers of said material.

21. The packing product according to claim 17, wherein said at least two layers of said material respectively include at least two colors to provide said two colors to said packing product.

22. The packing product according to claim 17, wherein said each strip means includes printing on at least one surface thereof.

* * * * *

US005134013B1

REEXAMINATION CERTIFICATE (3422nd)

United States Patent [19]

[11] B1 5,134,013

[45] Certificate Issued Jan. 20, 1998

Parker

[54] FOLDING AND CRIMPING APPARATUS

[75] Inventor: Johnny M. Parker, Vashon, Wash.

[73] Assignee: Ranpak Corporation

Reexamination Request:
No. 90/004,287, Jun. 26, 1996

Reexamination Certificate for:

| | |
|---|---|
| Patent No.: | **5,134,013** |
| Issued: | **Jul. 28, 1992** |
| Appl. No.: | **533,755** |
| Filed: | **Jun. 6, 1990** |

Related U.S. Application Data

[62] Division of Ser. No. 430,861, Nov. 2, 1989, Pat. No. 5,088,972.

[51] Int. Cl.$^6$ .................... B32B 3/28; D04H 1/04

[52] U.S. Cl. .................... 428/182; 428/174; 428/184; 428/196; 428/211; 428/222; 428/369; 428/370; 220/429; 493/967; 493/968

[58] Field of Search .................... 428/182, 174, 428/184, 211, 196, 222, 226, 227, 229, 292, 298, 299, 369, 370; 493/947, 948; 220/42 A

[56] References Cited

U.S. PATENT DOCUMENTS

| | | | |
|---|---|---|---|
| 1,680,203 | 8/1929 | Cannard | 493/967 |
| 1,985,676 | 12/1934 | Hand | 270/73 |
| 2,045,498 | 4/1936 | Stevenson | 28/1 |
| 2,271,180 | 1/1942 | Brugger | 428/119 |
| 2,537,026 | 1/1951 | Brugger | 156/470 |
| 2,621,567 | 12/1952 | Lee | 93/1 |
| 2,668,573 | 2/1954 | Larsson | 154/30 |
| 2,679,887 | 6/1954 | Doyle et al. | 154/30.05 |
| 2,686,466 | 8/1954 | Lee | 106/97 |
| 2,770,302 | 11/1956 | Lee | 104/97 |
| 2,786,399 | 3/1957 | Mason et al. | 93/1 |
| 2,865,080 | 12/1958 | Hentschel | 28/1 |
| 2,924,154 | 2/1960 | Russell et al. | 93/1 |
| 2,968,857 | 1/1961 | Swerdloft et al. | 28/72 |
| 3,126,095 | 3/1964 | Gaines et al. | 428/369 |
| 3,150,576 | 9/1964 | Gewiss | 93/84 |
| 3,217,988 | 11/1965 | Lightfoot et al. | 241/101 |
| 3,235,442 | 2/1966 | Stump | 428/369 |
| 3,398,223 | 8/1968 | Schatz et al. | 264/282 |
| 3,501,565 | 3/1970 | Kalwaites et al. | 264/287 |
| 3,509,797 | 5/1970 | Johnson | 493/467 |
| 3,613,522 | 10/1971 | Johnson | 156/183 |
| 3,650,877 | 3/1972 | Johnson | 493/407 |
| 3,754,498 | 8/1973 | Gil | 100/97 |
| 3,859,695 | 1/1975 | Erickson | 28/1 |
| 3,905,057 | 9/1975 | Willis et al. | 5/337 |
| 4,012,932 | 3/1977 | Gewiss | 72/187 |
| 4,075,746 | 2/1978 | Roberts | 28/264 |
| 4,085,662 | 4/1978 | Ottaviano | 493/354 |

(List continued on next page.)

FOREIGN PATENT DOCUMENTS 771877 3/1957 United Kingdom .

OTHER PUBLICATIONS

New Riverside University Dictionary, 1984, pp. 639 and 1247.

*Primary Examiner*—Donald J. Loney

[57] ABSTRACT

This invention comprises apparatus and methods for folding and crimping shredded strips of sheet material into preselected lengths of interlocking, decorative material and/or bulk packaging material. The apparatus generally includes an attachment for a commercial paper shredding device which shreds sheet material therein. The apparatus comprises a movable barrier against which the shredded strips of sheet material are impelled upon being expelled from cutting blades of the shredding device. The movable barrier causes the strips to become controllably jammed within a confined area between the barrier and the cutting blades. Further insertion of additional strips into the confined area causes the strips to become compacted, folded, and crimped against a remaining dam of jammed sheet material located within the confined area. This causes the strips to fold and press against themselves, and form lengths of thin sheet material having an accordion-shaped configuration. Cutting blade components may be provided to further cut the strips into preselected lengths.

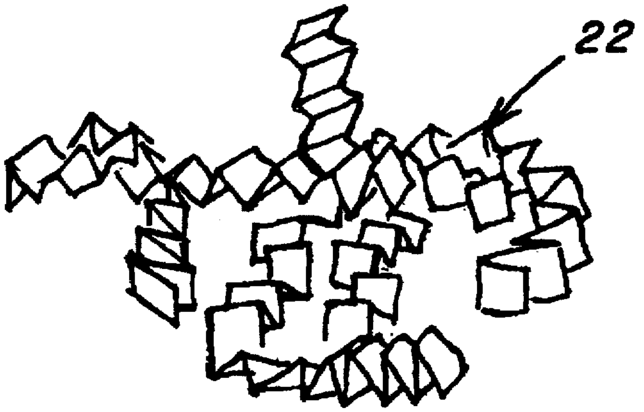

U.S. PATENT DOCUMENTS

| | | | |
|---|---|---|---|
| 4,132,155 | 1/1979 | Hicks et al. | 493/354 |
| 4,201,128 | 5/1980 | Whitehead et al. | 100/97 |
| 4,247,289 | 1/1981 | McCade | 493/386 |
| 4,410,315 | 10/1983 | Frye | 493/342 |
| 4,597,748 | 7/1986 | Wolf | 493/29 |
| 4,622,028 | 11/1986 | Bunch | 493/413 |
| 4,650,456 | 3/1987 | Armington | 493/464 |
| 4,699,609 | 10/1987 | Komaransky et al. | 493/357 |
| 4,700,939 | 10/1987 | Hathaway | 270/39 |
| 4,717,135 | 1/1988 | Hathaway | 220/52.3 |
| 4,718,654 | 1/1988 | Ehlers | 270/52.3 |
| 4,868,037 | 9/1989 | McCullough et al. | 428/222 |

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–16, 20 and 21 is confirmed.

Claims 17–19 and 22 are cancelled.

New claims 23–31 are added and determined to be patentable.

*23. A packing product comprising:*

*a plurality of narrow, elongated strip means of flat, substantially planar material;*

*each of said strip means having a small width dimension and a substantially longer length dimension;*

*said each strip means having a plurality of substantially transverse folds;*

*said each strip means including adjacent longitudinal portions at respective opposite sides of each of adjoining said folds; and*

*a majority of said adjacent longitudinal portions extending from said adjoining fold generally with an angle*

*therebetween to cause said strip means to be generally accordion-shaped;*

*said plurality of strip means being intertwined and interconnected to form a resilient mass of said packing product.*

*24. The packing product according to claim 23, wherein each of said adjacent longitudinal portions is substantially planar.*

*25. The packing product according to claim 23, wherein said material is selected from the group consisting of biodegradable material, pulp material, paper, cardboard, and mylar.*

*26. The packing product according to claim 23, wherein said each strip means includes at least two layers of said material.*

*27. The packing product according to claim 26, wherein said at least two layers of said material respectively include at least two colors to provide said two colors to said packing product.*

*28. The packing product according to claim 23, wherein said each strip means includes printing on at least one surface thereof.*

*29. The packing product according to claim 28 wherein the printing is located longitudinally along the length of each strip means.*

*30. The packing product according to claim 7 wherein the printing is located longitudinally along the length of the strip means.*

*31. The packing product according to claim 16 wherein the printing is located longitudinally along the length of the strip means.*

* * * * *